United States Patent

Montesissa et al.

[11] 3,890,259
[45] June 17, 1975

[54] ACIDIC OLEO-ACRYLIC RESINS AND PROCESSES FOR PREPARING SAME

[75] Inventors: Giorgio Montesissa; Giancarlo Del Signore, both of Piacenza, Italy

[73] Assignee: Duco S.p.A., Trieste, Italy

[22] Filed: Apr. 8, 1974

[21] Appl. No.: 456,950

[52] U.S. Cl. ............ 260/23 H; 106/14; 106/15 AF; 106/17; 106/18; 260/23 P; 260/23 AR; 260/405
[51] Int. Cl. .............................................. C08f 19/14
[58] Field of Search ... 260/23 H, 23 AR, 405, 23 P; 106/14, 15 AF

[56] References Cited
FOREIGN PATENTS OR APPLICATIONS 1,032,363   6/1966   United Kingdom
1,046,207   10/1966  United Kingdom

*Primary Examiner*—Melvyn I. Marquis
*Assistant Examiner*—Parker, William E.
*Attorney, Agent, or Firm*—Hubbell, Cohen, and Stieffel

[57] ABSTRACT

Disclosed are acidic resins formed by reacting

I. at least one poly-unsaturated monocarboxylic fatty acid containing 9 to 20 carbon atoms and more than one olefinic double bond (C=C), or an ester of said acid with a polyvalent alcohol or a mixture of said acids and esters; and II. an $\alpha$, $\beta$-unsaturated monocarboxylic acid of the formula:

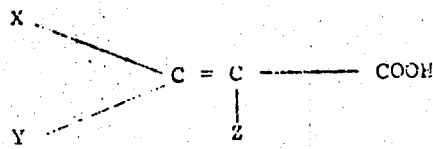

wherein X and Y are independently selected from the group consisting of hydrogen and alkyl groups having from 1 to 3 carbon atoms and Z is hydrogen or methyl group.

These resins, which are useful in the production of paints and varnishes are of an acidic nature and contain component (II) in the combined state, in an amount ranging from 5 to 25 percent by weight.

14 Claims, No Drawings

ACIDIC OLEO-ACRYLIC RESINS AND PROCESSES FOR PREPARING SAME

CROSS REFERENCE TO RELATED APPLICATIONS

None.

BACKGROUND OF THE INVENTION

1. Field of the Invention

The present invention relates to acidic resins having particular properties which render them useful in the production of resins for paints and varnishes.

More particularly, the invention relates to acidic oleoacrylic resins based on

I. at least one poly-unsaturated monocarboxylic fatty acid containing 9 to 20 carbon atoms and more than one olefinic double bond, or an ester of such acid with a polyvalent alcohol or mixtures of said acids and esters; and II. an $\alpha,\beta$-unsaturated monocarboxylic acid of the formula:

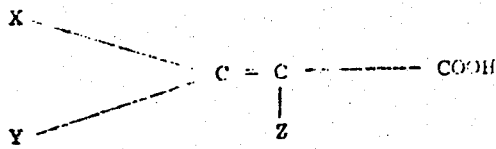

wherein X and Y are independently selected from the group consisting of hydrogen and alkyl groups having from 1 to 3 carbon atoms, and Z is hydrogen or methyl group, and wherein component (II) is present in the combined state in an amount ranging from 5 to 25 percent by weight of the total weight. The invention also relates to processes for preparing such resins.

2. Description of the Prior Art

Various adducts of acrylic acid (acrylic acid esters) with poly-unsaturated fatty acids are known from the literature. Thus, for example, U.S. Pat. No. 2,452,029 discloses oily monomeric addition compounds of 1 mole of an acrylic ester with 1 mole of a long-chain poly-unsaturated fatty acid having conjugated double bonds, obtained by reacting said components at a temperature between 80° and 155°C. According to English Pat. Nos. 1,032,363 and 1,046,207, di- or tri-basic acids are prepared by heating, in the range of 60° to 250°C, (Diels-Alder reaction) mixtures of poly-unsaturated fatty acids (or esters thereof) and a dienophile such as maleic acid, maleic acid anhydride, acrylonitrile, acrylic acid, methyl acrylate and acrolein, in the presence of iodine or sulphur. Finally, British Pat. No. 1,039,787 describes aqueous emulsions comprising, besides other substances, a salt (e.g. ammonium salt) of an acidic resinous product obtained by reacting a carboxylic aliphatic $\alpha,\beta$-unsaturated acid, such as fumaric acid, with an unsaturated oil, such as triglycerides of unsaturated fatty acids, at 240°–260°C.

According to the examples of this British patent, the fumaric acid is admixed with the unsaturated oil and then brought to the reaction temperature.

From this patent it is known that, in order to carry out the reaction, it is possible to employ, besides fumaric acid which is the preferred $\alpha,\beta$-unsaturated acid, other acids, such as maleic acid, crotonic acid, acrylic acid or sorbic acid.

As a matter of fact, the above mentioned reaction cannot be carried out with all $\alpha,\beta$-unsaturated acids. For example, by reacting a mixture consisting of an unsaturated oil (or an unsaturated fatty acid obtained from such oil) and acrylic acid at 260°C, one obtains, in addition to an acidic product that is similar in some respects to the product obtainable by using fumaric acid as the $\alpha,\beta$-unsaturated acid, large amounts of acrylic acid homopolymer, even when operating in the presence of large amounts of polymerization inhibitors. The presence of this homopolymer is evidenced by precipitation thereof with an excess of benzine.

The presence of this polyacrylic acid renders the product cloudy and non-homogeneous. Moreover, films obtained from such product can be air dried only with difficulty, they are opaque and scarcely water-resistant. After removal of the polyacrylic acid, the residual product exhibits an acidity and viscosity only slightly exceeding those of the starting poly-unsaturated fatty acids. If the reaction is conducted at a higher temperature with a view toward obtaining products with a higher viscosity and acidity, the homopolymerization of acrylic acid prevails over the other reactions.

SUMMARY OF THE INVENTION

The present invention provides a new class of acidic resins hereinafter sometimes referred to as "oleoacrylic resins," and processes for preparing same. These resins are the product of a reaction between I. at least one poly-unsaturated monocarboxylic fatty acid containing 9 to 20 carbon atoms and more than one olefinic double bond (C=C), or an ester of said acid with a polyvalent alcohol or a mixture of said acids and esters; and II. an $\alpha,\beta$-unsaturated monocarboxylic acid of the formula:

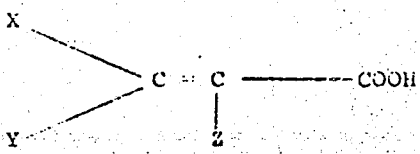

wherein X and Y are independently selected from the group consisting of hydrogen and alkyl groups having from 1 to 3 carbon atoms, and Z is hydrogen or methyl group.

These resins are of an acidic nature and contain component (II), in the combined state, in an amount ranging from 5 to 25 percent by weight.

With respect to component (I) it is possible to employ a single acid or ester, or a mixture of poly-unsaturated monocarboxylic fatty acids containing from 9 to 20 carbon atoms, or a mixture of their esters with polyvalent alcohols or a mixture of said acids and esters; however, if a single acid or ester is employed, it must contain at least two olefinic double bonds, and preferably at least one pair of conjugated olefinic double bonds.

Of course, conjugated pairs of double bonds, in addition to isolated double bonds may be present in the poly-unsaturated acids or esters employed. In practice, and for economic reasons, it is preferable to use as component (I), a mixture of monocarboxylic fatty acids (or esters thereof) which, in addition to the polyunsaturated acids (or esters) having at least two olefinic double bonds, may also contain mono-unsaturated and/or saturated acids, but preferably in amounts not exceeding 50 percent by weight of the total mixture. Moreover, it is to be taken into account that pairs of isolated double bonds, if present in the chains of the fatty acids (or their esters), of component (I) may isomerize under the reaction conditions, thus giving rise to conjugated double bonds.

As examples of component (I) which may be used in the invention, there are included: dehydrated fatty acids of castor oil, fatty acids of linseed oil, fatty acids of safflower oil, fatty acids of soya bean oil, fatty acids of tall oil and the so-called "isomerginic acids," i.e. poly-unsaturated fatty acids having at least one pair of conjugated double bonds, and obtained from fatty acids having isolated double bonds by isomerization (shift of double bonds) catalyzed by alkalis. Thus, for example, from linoleic acid there can be obtained a mixture of two fatty acids having conjugated double bonds:

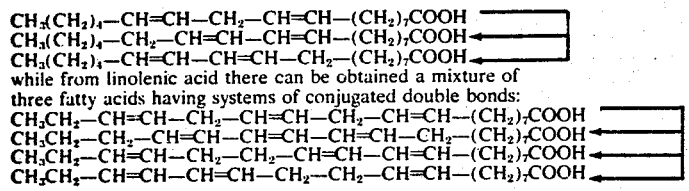

while from linolenic acid there can be obtained a mixture of three fatty acids having systems of conjugated double bonds:

Analogously, it is possible to isomerize polyenic fatty acids having a higher molecular weight or esters thereof with polyvalent alcohols such as glycerol, pentaerythritol, trimethylol-ethane, trimethylol-propane.

As component (II), the preferred acids are acrylic acid or methacrylic acid.

It has now been surprisingly found that it is possible to prepare acidic resinous products which are substantially free from significant amounts of homopolymerized acrylic acid by reacting (I) poly-unsaturated fatty acids (or esters thereof with polyvalent alcohols) with (II) $\alpha,\beta$-unsaturated acids, such as for example acrylic acid, at a temperature ranging from 250° to 300°C, by gradually admixing the $\alpha,\beta$-unsaturated anhydrous acid to the poly-unsaturated fatty acid or to a mixture of poly-unsaturated fatty acids (or esters thereof), heated to the reaction temperature, in amounts such that in the reaction mixture during the course of the reaction, the ratio by weight of free (uncombined) $\alpha,\beta$-unsaturated acid to combined $\alpha,\beta$-unsaturated acid is in the range of from 0.1 to 1, and is preferably constant within allowance limits not exceeding $\pm 0.05$, in order to obtain as uniform a final product as possible.

According to the invention, the process for preparing the acidic or oleo-acrylic resins of the invention is as follows:

A reactor, provided with a heating jacket, a stirrer and a reflux condenser, is charged with the poly-unsaturated fatty acids in the presence or absence of a solvent capable of forming an azeotrope with water, such as toluene or xylene. The mass is heated to a temperature between 180° and 220°C under reflux conditions, in order to remove any water contained in the polyunsaturated acids (or esters) by azeotropically distilling same off. Successively the temperature is raised to the selected value ($\pm 3$°C) in the range of from 250° to 300°C, and the $\alpha,\beta$-unsaturated acid, e.g. glacial acrylic acid, is gradually introduced under stirring into the reactor, generally, by means of a feeding pump. The optimum flow rate of the acid is fixed tentatively or by separate tests carried out under analogous conditions. Successively, periodic checkings of the amount of $\alpha,\beta$-unsaturated acid present in the free state in the reaction mixture are carried out by analyzing weighed samples of the reaction mixture withdrawn from the reactor and, if necessary, the required concentration of the acid in the reaction mixture is restored by varying the feed rate.

The reaction is conducted for a time varying from 10 to 30 hours, while carefully regulating the temperature at the top of the cooling column to a value of 50°–60°C which is necessary to recondense the $\alpha,\beta$-unsaturated acid in the reactor.

The reaction may be effected either in the presence or in the absence of an inert gas (nitrogen) at atmospheric pressure or, at the most, at a pressure of 2 atmospheres. The course of the reaction is monitored by analyzing from time to time (for example, at half-hour intervals) weighed samples of the reaction product for acid value, viscosity, refractive index, iodine number, color etc. As soon as these characteristics reach the desired values, the reaction is stopped by discontinuing the feeding of the $\alpha,\beta$-unsaturated acid. The excess of such acid in the reaction mixture can be removed by distillation, preferably under vacuum, at 60°–80°C, in the presence of an inert gas.

The oleo-acrylic resins according to the invention generally have an acid value between 60 and 300, a viscosity between the values P and $Z_{10}$ on the Gardner-Holdt scale, a content of combined $\alpha,\beta$-unsaturated acid ranging from 5 to 25 percent by weight, and are substantially free from significant amounts of homopolymerized $\alpha,\beta$-unsaturated acid.

Films obtained from the resins of the invention easily dry in air, they are glossy and water-resistant.

For the sake of safety, it is preferable to conduct the reaction between the poly-unsaturated fatty acid and the $\alpha,\beta$-unsaturated acid in the presence of a polymerization inhibitor, such as hydroquinone or suitable derivatives thereof, which inhibitors do not adversely affect the reaction.

The high percentage of carboxyl groups and the great reactivity of the resins of this invention render them useful as cross-linking resins when they are heat-treated in a furnace in admixture with other solvent-based or water-based resins. The presence of double bonds that are polymerizable by oxidation permits the use of these resins as resins capable of air-drying in admixture with other solvent-based or water-based resins.

In addition, the acidic resins of this invention may be used as intermediates for the preparation of resins, in particular, of those resins that are soluble or dispersible in water.

DESCRIPTION OF THE PREFERRED EMBODIMENTS

The following examples of the preparation of oleo-acrylic resins are given to better illustrate the present invention, without however being a limitation thereof.

EXAMPLE 1

1,800 g of a mixture of castor-oil dehydrated fatty acids, having an acid value ranging from 175 to 180, along with 1.4 g of hydroquinone and 6 g of xylene, were introduced into a 6 liter reactor provided with a stirrer, a heating jacket and a reflux condenser. The mixture was heated to a temperature of about 200°C, and heating was continued until all traces of the water contained in the mixture were removed. The temperature was then raised to 260°C ($\pm$ 3°C) and glacial acrylic acid was fed in at an initial flow rate of 20 g/h, while simultaneously feeding the reactor with a slight continuous flow of nitrogen. The temperature at the top of the reflux column was 60°C ($\pm$ 3°C).

From an analysis of samples drawn from the reaction mixture 15 to 25 minutes after starting the reaction, it was observed that about 75 percent of the introduced acrylic acid reacted, while the remaining 25 percent remained in the free state in the reactor. This corresponds to a weight ratio of free acrylic acid to combined acrylic acid equal to about 0.3. Acrylic acid was further added at a flow rate of about 20 g/h, with the flow rate being suitably varied during the course of the reaction according to the results of analyses of samples of the reaction mixture periodically drawn, in order to maintain the ratio of free to combined acrylic acid in the reactor at a constant of 0.3 $\pm$ 0.05 for the entire reaction period.

20 hours after the commencement of the reaction, during which time about 360 g of acrylic acid has been fed, the reaction product, when freed from the unreacted acrylic acid, exhibited a viscosity, measured at 25°C in the undiluted product, between the values $Z_2$ and $Z_3$ of the Gardner-Holdt scale, and an acid value of about 255. At this point, the feeding of acrylic acid was stopped, the reflux column was no longer cooled and the mixture was brought to a temperature ranging from 60° to 30°C under vacuum, these conditions being maintained until all of the unreacted acrylic acid had been extracted by distillation. About 90 g of acrylic acid were thereby obtained. The reaction product amounted to about 2,080 g and contained about 13 percent by weight of combined acrylic acid.

A sample of one part of the obtained product was mixed with 7 parts of benzine whereby a limpid solution was obtained, indicating the absence of any significant amounts of polyacrylic acid in the reaction product.

EXAMPLE 2

The same reactor as utilized in Example 1 was charged with 2,400 g of a mixture of poly-unsaturated monocarboxylic fatty acids, the so-called "isomerginic acids" (isomerginic acids SY, produced by Hamburger Fettchemie Brinckman & Mergell GmbH), having an acid value of about 190, along with 9 g of xylene. After removing traces of water by heating the mixture to about 200°-220°C, the temperature of the mixture was raised to 280°C ($\pm$ 3°C) and methacrylic acid was introduced into the reactor under stirring. Following the operating and monitoring techniques described in Example 1, the conditions were so adjusted as to obtain a weight ratio of free methacrylic acid to combined methacrylic acid equal to 0.5 ($\pm$ 0.05).

After 20 hours, during which 580 g of methacrylic acid had been fed, the reaction was stopped and about 195 g of unreacted methacrylic acid were obtained. The reaction product amounted to about 2,790 g; had a Gardner-Holdt viscosity value, at 25°C, between $Z_5$ and $Z_6$, an acid value of about 270 and a combined methacrylic acid content equal to about 13.8 percent by weight. The admixing of a sample of the product with benzine in a 1:7 ratio revealed the presence of only traces of polymethacrylic acid.

EXAMPLE 3

The reactor used in Example 1 was charged with 2,400 g of safflower oil along with 9.5 g of xylene. This mixture was heated under stirring to 200°-210°C until all traces of the water contained therein were removed. The mixture was then brought to a temperature of 255°C ($\pm$ 3°C), whereupon acrylic acid was gradually introduced into the reactor, so as to achieve in the reactor, a weight ratio of free acrylic acid to combined acrylic acid equal to 0.2 ($\pm$ 0.05). After 20 hours, during which 378 g of acrylic acid had been fed, the reaction was stopped and about 63 g of unreacted acrylic acid were extracted from the reaction mixture. The reaction product amounted to about 2,715 g; had a Gardner-Holdt viscosity, measured at 25°C in an undiluted sample, between the values P and R, an acid value of about 85 and a combined acrylic acid content of about 11.6 percent by weight.

A 1:7 mixture of the product with benzine revealed no significant amounts of polyacrylic acid in the product.

EXAMPLE 4

A reactor as described in Example 1 was charged with 2,500 g of a mixture of 45 percent by weight of conjugated linseed oil and 55 percent by weight of a mixture of castor oil dehydrated fatty acids having an acid value of 175-180, along with 9 g of toluene. After removing all traces of the water in the mixture by heating to about 200°C, the mixture was brought to a temperature of 280°C ($\pm$ 3°C) and acrylic acid was fed in, taking care that in the reactor a weight ratio of free acrylic acid to combined acrylic acid equal to 0.9 ($\pm$ 0.05) was maintained.

The reaction was conducted for 20 hours, during which 646 g of acrylic acid were fed in, after which the reaction was stopped and about 306 g of unreacted acrylic acid were extracted from the mixture by distillation at 60°-80°C under vacuum.

The reaction product amounted to about 2,840 g; had a Gardner-Holdt viscosity, measured at 25°C in the undiluted product, between the values $Z_5$ and $Z_6$, an acid value of about 186 and a combined acrylic acid content of about 12 percent by weight.

A 1:7 mixture of the product with benzine revealed that only traces of polyacrylic acid are present in the product.

EXAMPLE 5

2,200 g of a mixture of safflower oil fatty acids having an acid value of about 190 along with 8 g of toluene were introduced into a reactor as described in Example 1.

After heating at 200°–210°C for about 0.5 hour, the temperature of the mixture was increased to 255°C (± 3°C) and glacial acrylic acid was added at an initial flow rate of 32 g/h, while simultaneously feeding the reactor with a nitrogen flow.

The temperature at the top of the reflux column was about 50°C. Analysis of samples of the reaction mixture drawn during the time interval of 15–25 minutes after commencement of the reaction revealed that 58 percent of the introduced acrylic acid reacted, while the remaining 42 percent remained in the reactor in the free state. Thus, the ratio of free acrylic acid to combined acrylic acid in the reaction mixture was about 0.7. The feeding of acrylic acid was continued, taking care, on the basis of analyses of samples of the mixture drawn at regular time intervals, to suitably vary the feed rate so as to maintain the ratio of free to combined acrylic acid constant at about $0.7 \pm 0.05$ for the entire reaction period.

The reaction was stopped after 20 hours, during which time about 650 g of acrylic acid had been added. Approximately 268 g of unreacted acrylic acid were removed from the reaction mixture by distillation under vacuum at 60°–80°C. The reaction product amounted to about 2,582 g; had a combined acrylic acid content of about 14.8 percent, an acid value of 275–278 and a Gardner-Holdt viscosity value at 25°C between Q and S.

Only traces of polyacrylic acid were present in the reaction product.

COMPARATIVE EXAMPLE

This example is designed to prove that, when in the reaction mixture the weight ratio of free $\alpha,\beta$-unsaturated acid to combined $\alpha,\beta$-unsaturated acid is outside the range of from 0.1 to 1, the products obtained thereby do not possess satisfactory characteristics and are thus unusable.

The reaction was conducted by maintaining in the reaction mixture a weight ratio of free $\alpha,\beta$-unsaturated acid to combined $\alpha,\beta$-unsaturated acid of $1.2 (\pm 0.05)$.

The same reactor as used in Example 1 was charged with 2,000 g of castor oil dehydrated fatty acids, 9 g of toluene and 1.4 g of hydroquinone. The reactor was heated to about 200°C to remove the water traces from the mixture, after which the temperature was raised to 255°C (± 3°C) and glacial acrylic acid was fed at a flow rate of about 40 g/h, to establish a weight ratio of free acrylic acid to combined acrylic acid equal to 1.2 (± 0.05).

A sample of the reaction mixture was withdrawn from the reactor from time to time in order to determine the abovesaid ratio in the following way. From the withdrawn sample the free acrylic acid was removed by distillation under vacuum at 60°–70°C; from the residue of the sample, the polyacrylic acid was removed by precipitation with benzine and, finally, the amount of combined acrylic acid was determined by acidimetry on the thus obtained sample. The analyses of the samples withdrawn during a 30 minute period from the time at which acrylic acid feeding began, revealed that the weight ratio of free acrylic acid to combined acrylic acid was equal to about 1.2. At the same time, it was possible to visually observe the formation of polyacrylic acid on the reactor walls and in the reaction mass as well.

The reaction was stopped after 20 hours of feeding in the acrylic acid, i.e. when about 792 g of acrylic acid at a flow rate of about 40 g/h had already been introduced. By subjecting the reaction mixture to distillation under vacuum at 60°–80°C, about 234 g of free acrylic acid were obtained; about 360 g of polyacrylic acid were precipitated in the residue by adding benzine and, after distillation of the benzine, about 2,197 g of a reaction product having an acid value of about 231 and a Gardner-Holdt viscosity value, measured at 25°C in the undiluted product, between J and K were obtained. The combined acrylic acid contained in the reaction product amounted to about 9 percent.

Films prepared from this product comprising polyacrylic acid can be air dried only with difficulty, they are opaque and only scarcely water-resistant.

The product, after being freed from the polyacrylic acid, exhibits characteristics substantially similar to those of the starting fatty acids, and said product is, by consequence, unemployable either as a resin or as an intermediate for the preparation of water-based resins having a more complex molecular structure.

It was assumed that the exceptional characteristics of the resins according to the invention are attributable at least in part to the formation of addition products of the $\alpha,\beta$-unsaturated acid with oligomers (dimers and trimers) of the poly-unsaturated acids or esters.

This assumption is borne out by the following test conducted for analytical purposes.

EXAMPLE 6

A 6liter reactor provided with stirrer, heating jacket and reflux condenser was charged with 1,800 g of a mixture of castor oil dehydrated fatty acids having an acid value of 175–180, along with 6 g of xylene. The mixture was heated to 200°C until all traces of water had been removed. The temperature was then increased to 260°C (± 3°C) and maintained thereat for 20 hours. Samples taken from the reaction mixture and subjected to analysis, revealed that the acidity remained constant, while the viscosity of the product gradually increased, until reaching, after 20 hours, a value between G and H on the Gardner-Holdt scale. This product was subjected to gas-chromatographic analysis, as was a commercial dimeric product (DIMAC produced by Victor Wolf Ltd.) for comparative purposes.

The comparative gas-chromatographic analyses showed that the product obtained by heating to 260°C consisted of about 95 percent of dimers of the polyunsaturated fatty acids. This product, when reacted with acrylic acid according to the procedures described in Example 1, resulted in another product having an acid value of about 222 (corresponding to about 8 percent of combined acrylic acid) and a Gardner-Holdt viscosity value ranging from $Z_2$ to $Z_3$.

When this procedure is repeated employing the commercial dimeric product (DIMAC of Victor Wolf Ltd.), no product was obtained from the reaction with acrylic acid. In fact, the acidity and viscosity of the mass remained constant all through the heating period.

Variations and modifications can, of course, be made without departing from the spirit and scope of the invention.

Having thus described our invention, what we desire to secure by Letters Patent and hereby claim is:

1. An acidic resin consisting essentially of the product obtained by reacting, at a temperature between about 250° and 300°C,
   I. at least one poly-unsaturated monocarboxylic fatty acid having from 9 to 20 carbon atoms and more than one olefinic double bond or an ester of said acid with a polyvalent alcohol or a mixture of said acids and esters with
   II. an $\alpha,\beta$-unsaturated monocarboxylic acid of the formula:

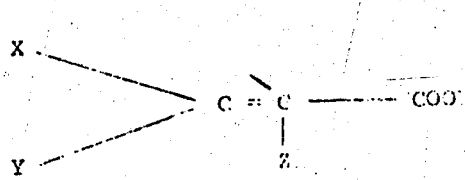

wherein X and Y are independently selected from the group consisting of hydrogen and alkyl groups having from 1 to 3 carbon atoms, and Z is hydrogen or methyl group, the reaction being carried out by admixing the $\alpha,\beta$-unsaturated monocarboxylic acid to component (I) in an amount such that in the reaction mixture, the weight ratio of free $\alpha,\beta$-unsaturated acid to combined $\alpha,\beta$-unsaturated acid is between 0.1 and 1; and wherein the $\alpha,\beta$-unsaturated monocarboxylic acid constitutes between 5 and 25 percent by weight of the product, said product having an acid value ranging from 60 to 300, a viscosity value between P and $Z_{10}$ on the Gardner-Holdt scale, and being substantially free of homopolymers of the $\alpha,\beta$-unsaturated monocarboxylic acid.

2. An acidic resin according to claim 1, wherein the $\alpha,\beta$-unsaturated acid is acrylic acid or methacrylic acid.

3. An acidic resin according to claim 1, wherein component (I) is a mixture of castor oil dehydrated fatty acids.

4. An acidic resin according to claim 1, wherein component (I) is soya bean oil.

5. An acidic resin according to claim 1, wherein component (I) is a mixture of safflower oil and dehydrated fatty acids of castor oil.

6. An acidic resin according to claim 1, wherein component (I) is a mixture of soya bean oil fatty acids.

7. An acidic resin according to claim 1, wherein component (I) is isomerginic acid.

8. A process for preparing an acidic resin according to claim 1, said process comprising reacting
   I. at least one poly-unsaturated monocarboxylic fatty acid having 9 to 20 carbon atoms and more than one olefinic double bond, or an ester of said acid with a polyvalent alcohol or a mixture of said acids and esters; and
   II. an $\alpha,\beta$-unsaturated monocarboxylic acid of the formula:

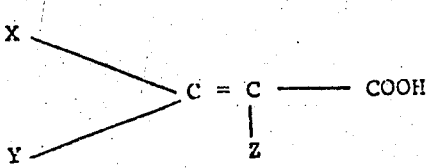

wherein X and Y are independently selected from the group consisting of hydrogen and alkyl groups having from 1 to 3 carbon atoms, and Z is hydrogen or methyl group at a temperature between about 250° and 300°C and at a pressure ranging from about 1 to 2 atmospheres, said reaction being carried out by admixing the $\alpha,\beta$-unsaturated monocarboxylic acid to component (I) which has been heated to the reaction temperature, in an amount such that in the reaction mixture, the weight ratio of free $\alpha,\beta$-unsaturated acid to combined $\alpha,\beta$-unsaturated acid is between 0.1 and 1.

9. A process according to claim 8, wherein component (I) is a mixture of castor oil dehydrated fatty acids.

10. A process according to claim 8, wherein component (I) is soya bean oil.

11. A process according to claim 8, wherein component (I) is a mixture of safflower oil and dehydrated fatty acids of castor oil.

12. A process according to claim 8, wherein component (I) is a mixture of soya bean oil fatty acids.

13. A process according to claim 8, wherein component (I) is isomerginic acid.

14. A process according to claim 8, wherein component (II) is acrylic acid or methacrylic acid.

* * * * *

PO-1050
(5/69)

UNITED STATES PATENT OFFICE
CERTIFICATE OF CORRECTION

Patent No. 3,890,259      Dated June 17, 1975

Inventor(s) Giorgio MONTESISSA and Giancarlo DEL SIGNORE

It is certified that error appears in the above-identified patent and that said Letters Patent are hereby corrected as shown below:

Title page, left side, should have -- Priority Data, Italian Application 22725-A/73, April 9, 1973 --.

Title page, left side, under "Attorney, Agent, or Firm": "Stieffel" should read -- Stiefel --.

Column 5, line 37:    "has" should read -- had --.

Column 6, line 30:    "2.715 g;" should read -- 2,715 g; --.

Column 6, line 59:    "186" should read -- 168 --.

Column 10, last line of claim 8:    "01" should read -- 0.1 --.

*Signed and Sealed this*

*fourteenth* Day of *October 1975*

[SEAL]

*Attest:*

RUTH C. MASON
*Attesting Officer*

C. MARSHALL DANN
*Commissioner of Patents and Trademarks*